Nov. 16, 1937.  W. STELKENS  2,099,320

METHOD OF UNITING CURVED BODIES INCLUDING BOOTS AND SHOES

Filed Jan. 22, 1934

Inventor:
Willy Stelkens
by Karl Michaelis
Atty.

Patented Nov. 16, 1937

2,099,320

UNITED STATES PATENT OFFICE 2,099,320

METHOD OF UNITING CURVED BODIES INCLUDING BOOTS AND SHOES

Willy Stelkens, Cologne-on-the-Rhine, Germany

Application January 22, 1934, Serial No. 707,763
In Germany January 26, 1933

2 Claims. (Cl. 12—142)

My invention relates to means for solidly uniting all kinds of plane or slightly curved bodies, more especially with curved contours including veneers, glass plates, tissues, leather etc.

The invention is more particularly adapted for use in the manufacture of boots and shoes of the kind in which the upper or vamp shall be solidly united with the sole by means of a cement.

It is an object of my invention to provide means whereby this connection can be effected in a better and more efficient manner than was hitherto possible, the parts being connected more firmly, less time being consumed in the operation of connecting them and a considerable saving of material being obtained.

With these and other objects in view I am now going to describe my invention as applied to the manufacture of boots and shoes, although I wish it to be understood that it can also be applied with great advantage to the manufacture of plywood, safety glass, leather belting for transmissions and conveyers etc.

As is well known to those skilled in the art, in uniting any such bodies by means of agglutinants the liquid adhesives applied to the surface with a brush have been superseded largely by solid agglutinants having the form of folia, which on being treated with a volatile solvent or on application of heat are caused to soften, whereupon the agglutinant on solidifying will firmly secure the parts to be united together. In this manner the surfaces to be united can be covered with a more uniform layer of agglutinant than in the case of the liquid adhesives formerly used. However in the case where bodies shall be united only at their marginal portions as in the case of the soles and vamps mentioned above, to use a folium covering the entire surface would be mere waste. On the other hand it is not possible to bend a strip of a solid agglutinant to follow the curved contour without distortion.

I have now found that narrow curved surfaces such as the marginal portions of a sole and a vamp can readily be united in a particularly uniform and efficient manner by depositing a semisolid and plastic cement along the curved marginal portion of one of the parts, or on both parts, in the form of a cord, which is then flattened by pressure to form a ribbon of even width and height closely following all curvatures, depressions, projections etc. which may exist on the parts to be united.

I may use a cord (or a plurality of such) of plastic cement as it emerges from the nozzle of a press cylinder, from which it is extruded in the form of a cord. The plastic cement enclosed in the cylinder on emerging from the nozzle may approach more or less the solid state or may possess a higher plasticity without attaining the state of fluidity characteristic of the fluid agglutinants or adhesives formerly used and without being particularly tacky.

This cord is then flattened by rolling or hammering and is thus distributed evenly and uniformly over the marginal portion of one of the two bodies to be united whereupon it is rendered tacky by applying a solvent which causes it to swell and to acquire the properties characteristic of a true agglutinant.

In the drawing affixed to this specification and forming part thereof an apparatus for depositing and distributing the agglutinant on the sole of a shoe or boot is illustrated diagrammatically by way of example.

In the drawing—

Figure 1:
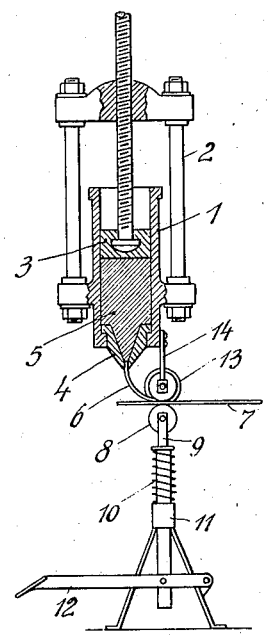
Fig. 1 is an elevation, partly in vertical section, of one modification of the apparatus, Fig. 2 illustrating a detail drawn to a larger scale.
Figure 2:
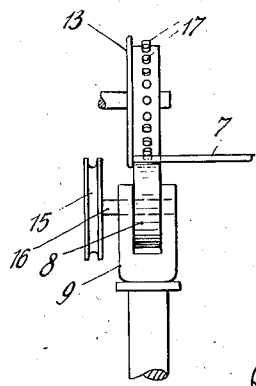

Referring now to the drawing and first to Figs. 1 and 2, 1 is the cylinder, 2 is the structure supporting same, 3 is the piston movable in the cylinder, 4 is the nozzle mounted in the bottom end of the cylinder, 5 is a body of plastic cement acted upon by the piston, 6 is the cord of cement issuing from the nozzle, 7 is a sole, on the marginal portion of which the cement is being deposited, 8 is a roller supporting the marginal portion of the sole, 9 is a fork supporting roller 8, 10 is a spring tending to raise the roller, 11 is a support for the fork 9, and 12 is a pedal lever serving to lower the fork 9 and roller 8 against the action of spring 10. 13 is a flanged roller arranged in line with the roller 8 and supported by a fork 14 fixed to the cylinder 1. 15 is a sheave mounted on the axis 16 supporting roller 8. As shown in Fig. 2, the flanged roller 13 may be formed with projections 17 serving to form the plastic cord deposited on the sole with indentures to hold a solvent, later to be applied, which revives the agglutinant and restores it to a tacky condition.

Figure 5:
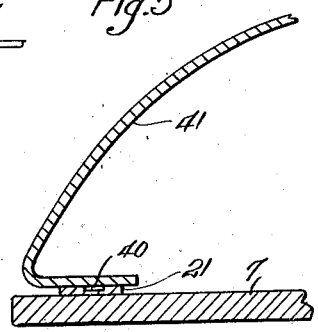
Fig. 5 is a partial cross section, drawn to an enlarged scale, of a sole and vamp about to be united in accordance with this invention.

The work piece such as the sole 7, the marginal portion of which may have been previously scratched as usual, is inserted between the two rollers, the flange of roller 13 serving to hold the sole in position therebetween, and the sole is now guided between the rollers in such manner that the whole of its marginal portion is passed through between them. When the plastic cord of cement 6 issues from the nozzle 4 it is deposited on the marginal portion of the sole and is flattened by the roller 13 which presses the cement on the work forcing the cement in all the inequalities which may have been formed by the scratching operation. The flat ribbon now forms a coating of uniform width and thickness. The projections 17 on the circumference of the roll have entered the mass of cement, forming indentures 40 therein, without however entering the leather. The cement may now be rendered tacky by applying a solvent which causes it to swell and to acquire the properties characteristic of a true agglutinant. The sole is now pressed against the marginal portion of the vamp or upper 41 (Fig. 5) and by applying pressure the parts are firmly united with each other. Alternatively the cement may be allowed to solidify on the sole and may subsequently be revived by applying a solvent before uniting the parts by pressure.

Figure 3:
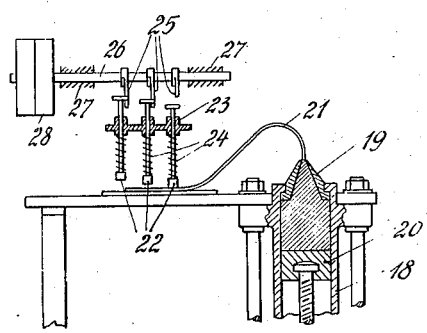
Fig. 3 is an elevation partly in vertical section of a second modification, while Fig. 4 again illustrates a detail on a larger scale.
Figure 4:
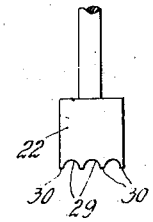

In the apparatus illustrated in Fig. 3 the cylinder 18 is mounted in inverted position with the nozzle 19 on top and the piston 20 acting from below, so that the cord 21 of cement is forced upwardly to be deposited on the sole placed on a table. 22 are rams mounted for alternate consecutive vertical reciprocation in sleeves 23 against the action of springs 24, which tend to hold them down, and acted upon by the lifting cams 25 mounted on a shaft 26 supported in bearings 27 and set rotating by means of a pulley 28, and a belt (not shown).

Here the rams 22 being alternately lifted by the cams and allowed to drop again under the action of the springs play the role of the roller 13 described with reference to Fig. 1 in flattening the cord 21. Preferably the active bottom faces of the rams 22 are formed with furrows 29 and projections 30 serving the same purpose as the projections 17 of roller 13, to hold the solvent when applied to the strip of cement.

A suitable composition for use as a cement in accordance with the invention may be prepared as follows: 35 parts by weight nitrocellulose (the normal collodion wool), 25 parts nitrocellulose of low viscosity and 15 parts ethylacetanilid, to which have been added 30 parts alcohol and 20 parts ethylacetate, are strongly mixed in a kneading device to form a homogeneous mass, whereupon the solvent is evaporated to the extent that the residuum weighs about 100 kilograms containing about 25% solvent. This mass, if filled into one of the cylinders above described, is ready for expulsion under the form of a semi-solid plastic cord.

Instead of directly depositing these cords on one of the surfaces to be united, I may also render them storable by winding them on bobbins which are then enclosed for instance in tins for subsequent use. In order to prevent the superposed layers of the cord from sticking together during storage, I prefer powdering the cord, before winding it up, with a non-swelling substance, such as for instance talc, or better still with a substance which, while being insoluble in the solvent contained in the mass, dissolves in the solvent subsequently applied to the ribbon in order to cause it to swell. I have found for instance cellulose diacetate, which is not soluble in alcohol and camphor, to be particularly useful in this connection, and by powdering the cord, as it issues from the nozzle, with cellulose diacetate, which will thereafter dissolve in the solvent (acetone or the like) causing the cord to swell, I prevent the superposed layers of the cord from sticking together during storage.

I have further found that if operating with a sufficiently thick cord of a cement of this new type it is possible to dispense with a scratching of the leather since the cement will fill all depressions formed in the leather surface, more especially if the cement has previously been rendered more plastic, for instance by heating the cylinder, in which it is contained.

I claim:—

1. The method of cementing the sole of a boot or shoe to the vamp which comprises depositing a cord of a semi-solid cement along the marginal portion of one of the parts to be united, exerting pressure on said cord to flatten same, applying to said cord a solvent to cause the cement to swell and become tacky, bringing the part with the cement covering its marginal portion in contact with the marginal portion of the other part, and uniting said portions by applying pressure.

2. The method of uniting two surfaces by cementing which comprises depositing on one of the surfaces an extruded cord of a semi-solid cement, exerting pressure on said cord to form it into a flat ribbon, applying to the cement a solvent to cause the cement to swell and to become tacky, assembling the two surfaces, and applying pressure to said ribbon through said surfaces to unite them.

WILLY STELKENS.